Figure 3:
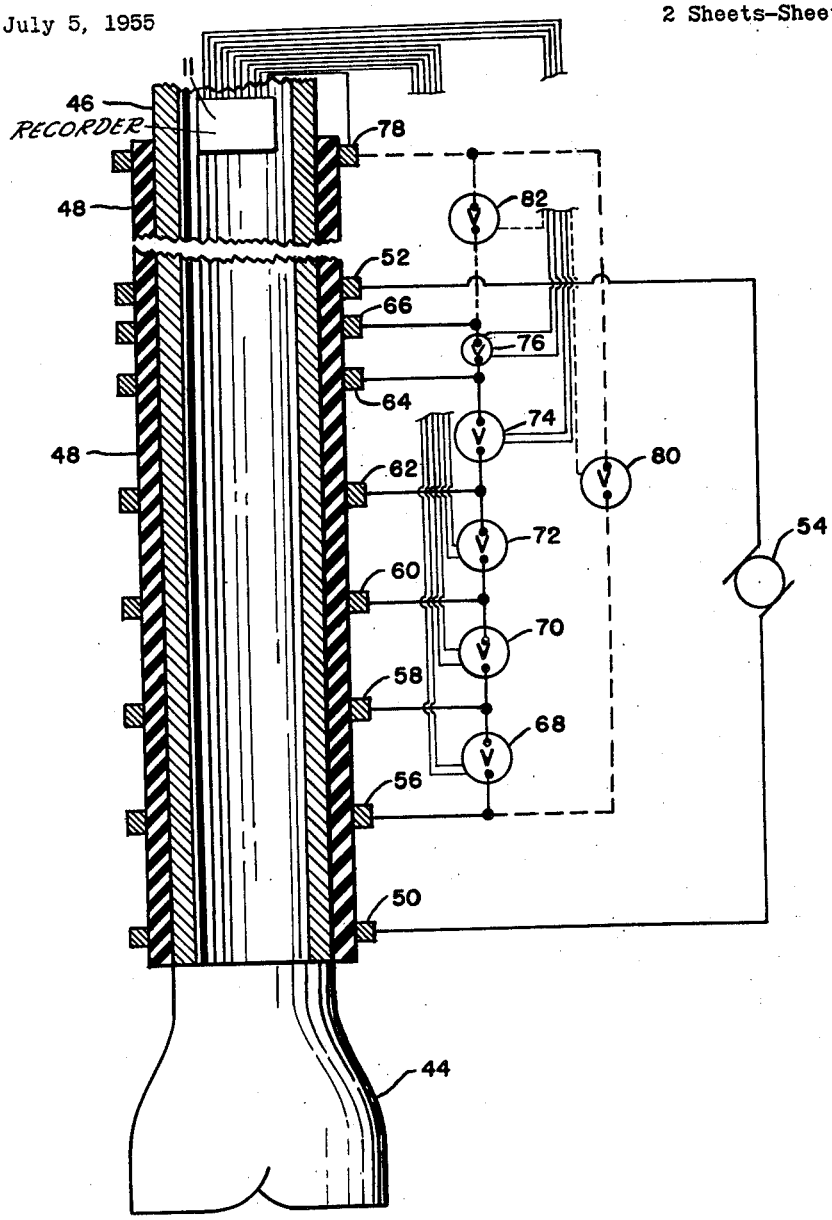

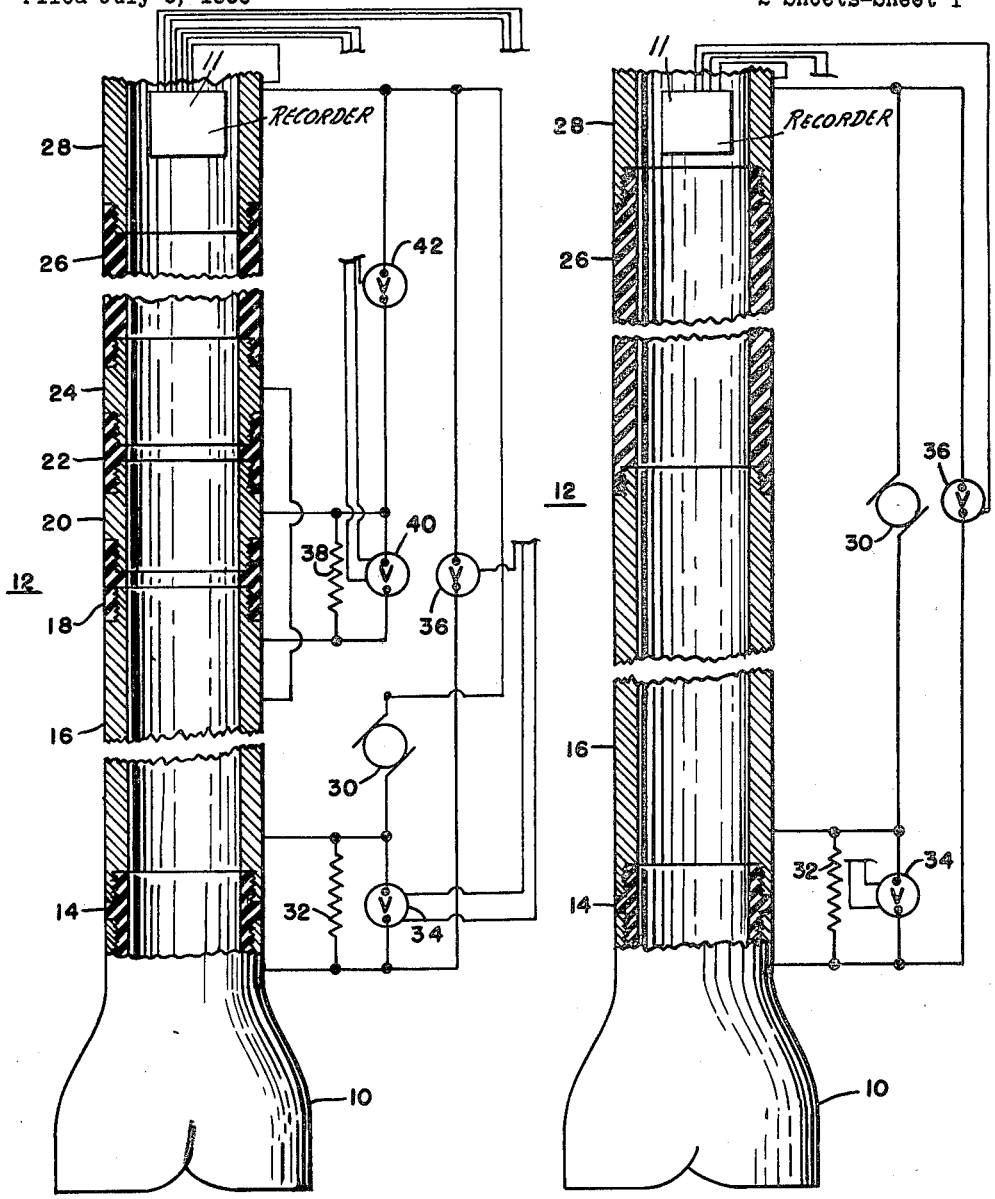

United States Patent Office 2,941,784
Patented June 21, 1960

2,941,784
LOGGING WHILE DRILLING

John L. Martin, Irving, Tex., assignor to The Atlantic Refining Company, Philadelphia, Pa., a corporation of Pennsylvania Filed July 5, 1955, Ser. No. 519,721

6 Claims. (Cl. 255—1.8)

The present invention relates to a method and apparatus for determining the characteristics of earth formations traversed by a borehole and particularly to a method and apparatus for electrically logging boreholes during drilling operations.

Although electrical logging apparati and methods employed heretofore furnish fairly reliable information of a qualitative nature, it is also highly desirable to obtain information of a quantitative nature. However, in order to obtain such quantitative information from present day electrical log measurements it is necessary to correct such measurements to eliminate interfering factors which distort the ordinary electrical leg measurements and then to mathematically convert such corrected measurements to values indicative of oil, its location and the ease with which it may be removed from the formation in which it exists, which are obviously the ultimate factors to be determined and are the motivating forces in any study of earth formations traversed by a borehole.

For example, in order to determine the hydrocarbon saturation of a particular formation it is first necessary to determine the water saturation of the formation and subtract this value from unity to obtain the hydrocarbon saturation. Water saturation, in turn, is expressed by the following equation:

$$S^n = \frac{FR_w}{R_t}$$

In this equation, known as the Archie equation, S represents the water saturation of the formation, $n$ is the saturation exponent, assumed to be a value from 1.8 to 2.0, F is the formation resistivity factor, $R_w$ is the resistivity of the formation water, and $R_t$ is the true resistivity of the formation.

$R_w$ is generally obtained by direct measurements on a sample of formation water. However, the other terms of this equation, F and $R_t$, are not so readily obtained.

F depends upon the porosity of the formation and the manner in which the void space is distributed throughout the formation, and one accepted method of determining this value is by obtaining a sample of the formation, measuring its resistivity when it is 100 percent saturated with brine and measuring the resistivity of the brine. Since $S^n$ in the equation given above would be 1 for a formation 100 percent saturated with brine, F may be determined by substituting the measured resistivity of the brine for $R_w$ and the measured value of the resistivity of the formation 100 percent saturated with brine for $R_t$ and solving for F. This method of obtaining F is thus time consuming, is dependent upon the ability to obtain a sample of the formation and is generally not determined in time to be of value during actual drilling operations.

In addition, $R_t$ is not directly obtainable from electrical log measurements, since the resistivity measured by the electrical log must be corrected to eliminate several factors which cause these measured resistivities to differ from the true resistivity of the formation of interest. These factors, include; the effect of the presence of a conductive column of drilling fluid, the effect of the presence of a drilling fluid filtrate-invaded zone of formation surrounding the borehole, and the effect of the presence of neighboring strata, referred to as "hole effect," "invasion effect" and "bed thickness effect," respectively. As is known to those skilled in the art, invasion effect is probably the most disturbing factor and the most difficult to accurately compensate for. Thus, in order to determine $R_t$, for use in the above-mentioned equation, the measured resistivity obtained from the electrical log must be corrected to eliminate all three of these factors, usually by using correction values obtained from a series of correction curves whose values are based on past experience in actual logging and laboratory model measurements. Obviously, these correction values can be merely approximations since it is unlikely that any given formation will have the same characteristics as a previously studied natural formation or that a laboratory model will exactly duplicate the condition of a natural formation.

Therefore, it is apparent that more accurate data of a quantitative nature could be obtained if some of the factors which interfere with electrical log measurements could be eliminated and direct measurements of values employed in the water saturation equation could be made. Further, during the actual drilling of a borehole, particularly during exploratory or "wildcat" drilling operations, there is always the possibility that a productive formation will be drilled through and bypassed without notice since electrical log measurements are generally made after the formation has been drilled through, and there is a consequent loss of drilling time connected with electrical log measurements since drilling operations must be suspended in order to carry out such measurements. Thus, it would also be highly advantageous to obtain as much information as possible during the actual drilling operations..

It is, therefore, an object of the present invention to provide an improved method and apparatus for electrically logging formations traversed by a borehole during the drilling thereof.

Another and further object of the present invention is to provide an improved method and apparatus for simultaneously measuring several characteristics of formations traversed by a borehole which are necessary for a determination of the hydrocarbon saturation of such formations.

A further object of the present invention is to provide an improved method and apparatus for simultaneously measuring during the drilling of a borehole several characteristics of formations traversed by the borehole which are necessary for a determination of the hydrocarbon saturation of such formations.

Another and further object of the present invention is to provide an improved method and apparatus for measuring characteristics of a formation traversed by a borehole which can be employed directly, without substantial correction, to determine hydrocarbon saturation of such formation.

Another object of the present invention is to provide an improved method and apparatus for measuring the true resistivity of formations traversed by a borehole.

Still another object of the present invention is to provide an improved method and apparatus for measuring the resistivity of formations traversed by a borehole wherein the hole effect, invasion effect and bed thickness effect are substantially eliminated.

A still further object of the present invention is to provide an improved method and apparatus useful in determining the formation factor and true resistivity of a formation traversed by a borehole.

Still another object of the present invention is to provide an improved method and apparatus for determining the rate of invasion of drilling fluid into a formation traversed by a borehole.

These and other objects and advantages of the present invention will be apparent from the following detailed description of my invention in conjunction with the drawings.

The instant invention will be readily understood by reference to the drawings, wherein Figure 1, partially in section, represents one form of the combination apparatus suitable for the practice of the instant invention, Figure 2, partially in section, represents a subcombination of the apparatus of Figure 1 which is also suitable for independent use in accordance with the instant invention, and Figure 3, partially in section, represents an alternative embodiment of the present invention.

Referring specifically to Figure 1, the numeral 10 designates a conventional drill bit, the numeral 11 designates a downhole recorder capable of simultaneously recording depth and the measurements to be described hereinafter and the numeral 12 designates generally the lower portion of a drill string suitably connected to bit 10 at the upper end of bit 10. Immediately above bit 10, and forming a part of drill string 12, is insulator ring 14. Insulator 14 may be made of any suitable electrical insulating material which will prevent the passage of electrical current from bit 10 to the metallic portions of drill string 12. Insulator 14, as well as the other insulators hereinafter referred to, may obviously take various forms and be connected to bit 10 and drill string 12 by means other than threaded joints as shown in the drawings provided that effective electrical insulation is obtained. Connected directly above insulator 14 is a long steel collar 16, which is preferably 5 to 10 feet in length. Above steel collar 16 and connnected thereto is insulator 18 which is also made of a suitable electrical insulating material and is comparatively short in length. Connected to the upper end of insulator 18 is a short steel collar 20. Steel collar 20 is in turn connected at its upper end to another short insulator 22. A second short steel collar 24 is attached to the upper end of insulator 22. Steel collar 24 is connected to the upper section 28 of drill string 12 through insulator 26. Insulator 26 is preferably about 3 to 4 feet in length. A suitable alternating current generator 30 preferably of the downhole type is electrically connected to drill bit 10 and the upper section 28 of drill string 12. Steel collar 16 is electrically connected to the circuit of generator 30 and steel collar 24 is electrically connnected to steel collar 16 thus maintaining bit 10 and steel collar 16 at essentially the same potential and steel collar 24 at the same potential as steel collar 16. Resistor 32 is connected between bit 10 and steel collar 16. Resistor 32 is of a very low value just sufficient to effect a small voltage drop betweent bit 10 and steel collar 16. The potential drop across resistor 32 is measured by voltmeter 34 and the potential drop between bit 10 and the upper section 28 of drill string 12 is measured by voltmeter 36. Resistor 38, similar to resistor 32, is connected between steel collar 16 and steel collar 20. The potential drop across resistor 38 is measured by voltmeter 40 and the potential drop between the upper section 28 of drill string 12 and steel collar 20 is measured by voltmeter 42.

In the operation of the apparatus of Figure 1 a suitable low-frequency alternating current is generated by generator 30 and this current is passed through bit 10, through the earth, and back to the current return located on upper section 28 of drill string 12. By connecting steel collar 16 to the generator circuit, steel collar 16 is maintained at substantially the same potential as bit 10, and thus current flowing from bit 10 is prevented from flowing upwardly through the conductive column of drilling fluid in the borehole thus substantially eliminating hole effect from measurements made at bit 10. In other words, applicant is supplying all the current necessary to the insulated drill pipe section 24, Figure 1, so that substantially all of the current flow in the drilling fluid occurs between section 24 and section 28 which are at different potentials. Since bit 10 and section 16 are maintained at essentially the same potential, the drilling fluid in this region will also be at the same constant potential; and, hence there will be no, or almost no, current between bit 10 and section 16. As a result, any current measured by voltmeter 34 across resistance 32 will have to leave the bit 10, cross the fluid between bit and hole wall (essentially no fluid here), enter the formation, and return through the formation to the drill pipe 28, across the drilling fluid, between the hole wall and the drill pipe. The current from bit 10 will be forced to flow in a horizontal or below horizontal direction in the vicinity of the borehole due to the presence of an additional current from sections 16, 20, and 24, which is not measured with the current from bit 10 but which has to enter the formation to return to drill pipe 28 (although a portion of this flow will occur in the fluid between section 24 and drill pipe 28). Further, insulator 14 prevents current from flowing from bit 10 up the drill string to the current return. This combination of current blocking elements therefore causes current to flow from bit 10 into the earth in a generally hemispherical pattern and thus also substantially eliminates bed thickness effects resulting from the existence of formations of differing resistivities above the bit. In addition, bed thickness effects resulting from lower formations are reduced due to the fact that bit 10 functions as a point electrode in these lower formations. Further, by employing bit 10 as one electrode of the measuring device it is possible to obtain resistivity data before any appreciable invasion of drilling fluid into the formation and invasion effect is accordingly substantially eliminated. Therefore, it may be seen that measurements made at the bit electrode will be an accurate measure of true resistivity of the formation in contact with the bit and it is not necessary to correct such measurements for hole effect, invasion effect and bed thickness effect. Accordingly, true resistivity $R_t$ may be expressed as:

$$R_t = K \frac{V_{36}}{V_{34}}$$

where $V_{34}$ is the potential drop measured by voltmeter 34, $V_{36}$ is the potential drop measured by voltmeter 36, and K is a constant dependent upon the value of resistor 32 and the dimensions of bit 10.

Since steel collar 16 is also electrically connected to steel collar 24, in order to maintain these two steel collars at the same potential, and steel collar 20, which forms a second potential measuring electrode of the present system, is also maintained essentially at this same potential, current flowing into the earth from steel collar 20 will be directed into the earth as a horizontal sheet of current. Further, steel collar 20 is located a sufficient distance from the bit to assure drilling fluid filtrate invasion; and, by proper choice of the length of steel collar 24 and the location of the current return located on upper section 28 of drill string 12, the resistivity of the drilling fluid filtrate-invaded zone only may be measured. The accuracy of this measurement is also improved by the fact that the outside dimensions of steel collar 20 are only slightly less than the dimensions of the borehole and hole effect is substantially reduced. Therefore, the resistivity of the invaded zone can be expressed as:

$$R_i = K \frac{V_{42}}{V_{40}}$$

wherein, $R_i$ is the resistivity of the invaded zone, $V_{40}$ is the potential drop measured by voltmeter 40, $V_{42}$ is the potential drop measured by voltmeter 42, and K is a constant dependent on the value of resistor 38 and the geometry of the measuring system. By merely measuring the resistivity of the drilling fluid filtrate employed, it is possible to calculate formation factor by substituting in the Archie equation. For a formation 100 percent saturated with drilling fluid filtrate, $S^n$ would be 1 and the Archie equation can be solved for F to give the following expression:

$$F = \frac{R_i}{R_{mf}}$$

wherein, F is the formation factor, $R_i$ is the resistivity measured at steel collar 20, and $R_{mf}$ is the resistivity of the drilling fluid filtrate. Therefore, formation factor can be obtained by the practice of the instant invention without the necessity of obtaining samples of the formation of interest.

By reference to the Archie equation it may be seen that all values necessary for the calculation of water saturation of the formation under study can be obtained by the practice of the present invention, with the exception of resistivity of formation water, $R_w$, which can be readily obtained by analyzing a water sample obtained from a drill stem test or from water sample data previously obtained for the same formation in other boreholes. Thus, except for factors which are readily obtained or have already been obtained prior to drilling, all factors necessary for the determination of water saturation, and ultimately hydrocarbon saturation of a formation traversed by a borehole can be directly obtained from logs produced in accordance with the present invention.

By further reference to Figure 1, it may be seen that insulators 18 and 22 may be combined in the form of an annular insulating pad surrounding drill string 12 and an electrode imbedded in this annnular pad may be substituted for steel collar 20. Accordingly, since there would be no dividing insulators located between steel collar 16 and steel collar 24 the latter would be merely an extension of steel collar 16 and the same potential would be impressed at all points along the extended collar. Thus, the necessity of an electrical connection between steel collar 16 and steel collar 24 would also be eliminated, and the same measurements obtained by the apparatus shown would be made by voltmeters 40 and 42 in this variation.

Referring now to Figure 2, it is clear from the discussion of Figure 1 appearing above that the subcombination of Figure 2 may be employed to measure directly true formation resistivity which alone is a valuable piece of information to the oil explorer. In Figure 2, all elements are designated by the same numerals employed in Figure 1 to designate the corresponding elements of the combination of Figure 1, and, therefore, it is believed unnecessary to further describe Figure 2.

Figure 3 represents an alternative apparatus which may be employed in accordance with the present invention. The particular method and apparatus shown in Figure 3, although a distinct improvement over the prior art methods and apparati, is a less desirable form of the instant invention since certain corrections of the measured values must be made. However, as will appear from the following description of Figure 3, this apparatus is capable of obtaining additional information which is not obtained in the use of the apparatus of Figures 1 and 2.

In Figure 3 the numeral 44 designates a conventional drill bit the upper end of which is attached to a metallic drill string 46. Surrounding drill string 46 immediately adjacent the upper end of bit 44 is an insulator 48 which is made of a suitable electrical insulating material. Mounted on insulator 48 are current electrodes 50 and 52, respectively. These electrodes, as well as the potential electrodes referred to hereinafter, may take the form of metallic rings, as shown, or point electrodes, and either type may be mounted as shown or flush mounted provided that in the latter case there is a layer of insulating material between the electrode elements and drill string 46. It is also possible to have point electrodes spring mounted in order to obtain intimate contact between the electrodes and the borehole formation although this variation is not necessary due to the closeness of the electrodes to the formation in the apparatus shown. Current electrode 50 is located near bit 44, for reasons which will be pointed out hereinafter. Alternating current generator 54 is provided to supply current to the system and is accordingly electrically connnected to current electrodes 50 and 52 to form a complete circuit from the generator, through one current electrode, through the formation forming the walls of the borehole, back to the second current electrode and thence to the opposite terminal of the generator. Potential electrodes 56, 58, 60, 62, 64 and 66 are positioned on insulator 48 intermediate current electrodes 50 and 52. Potential electrode 56 may be spaced, for example, 16 inches, or any other desired distance, above current electrode 50, and potential electrodes 58, 60, 62 and 64, respectively, are spaced an equal distance from the next preceding potential electrode. Potential electrode 66 is spaced a shorter distance below current electrode 52 than the spacing between current electrode 50 and potential electrode 56, and is preferably four inches below current electrode 52 when a 16 inch spacing is employed between current electrode 50 and potential electrode 56. For reasons which will be apparent from the following discussion of this form of apparatus the spacing between potential electrodes 64 and 66 is shorter than the spacing between the other potential electrodes and is preferably also about four inches. The potential drop between potential electrodes 56 and 58, between 58 and 60, between 60 and 62, between 62 and 64 and between 64 and 66 is measured by voltmeters 68, 70, 72, 74 and 76, respectively. Alternatively, the potential drop between potential electrode 56 and an additional potential electrode 78 mounted on insulator 48 may be measured by voltmeter 80. Likewise, the potential drop between potential electrode 66 and potential electrode 78 may be measured by voltmeter 82. Where potential drops are to be measured between electrode 56 and electrode 78, insulator 48 is preferably extended a considerable distance up drill string 46 in order to prevent current flow from current electrode 52 from short circuiting around the upper end of insulator 48 to drill string 46; or, as is generally referred to in the art, an "infinite" distance from current electrode 52.

The apparatus shown in Figure 3 may be used in a manner similar to that of Figure 1. The potential drop measured by voltmeter 68 is proportional to the formation resistivity. Since the potential electrode 56 is located close to drill bit 10 and resistivity measurements are made while drilling, the resistivity indicated by voltmeter 68 will be measured before any appreciable invasion of the formation by drilling fluids has occurred and there is thus no necessity to correct for invasion effect. In addition, since electrodes 56 and 58 are close to the formation by virtue of the fact that drill string 46 closely approaches the size of the borehole, hole effect is reduced. However, this measured resistivity should preferably be corrected for bed thickness effect and in some cases for slight distortion due to hole effect. Under certain circumstances, depending upon the nature of the formation under study, it may be desirable to measure the formation resistivity with voltmeter 80, and in some instances resistivities measured by both voltmeters 68 and 80 will be advantageous.

The invaded zone resistivity may also be measured with the apparatus of Figure 3, since the potential drop measured between electrodes 64 and 66 is restricted to the depth of the drilling fluid filtrate-invaded zone. Thus, the invaded zone resistivity will be measured by voltmeter 76 and after correction for bed thickness effect this measurement may be employed to determine formation factor in the same manner as this factor is determined in connection with the apparatus of Figure 1.

Voltmeter 82 or both voltmeter 82 and voltmeter 76 may also be employed to measure the invaded zone resistivity. Optionally used voltmeters 80 and 82 are connected in the same manner as the remainder of the voltmeters shown in Figure 3; however, for the sake of simplicity, their connections, shown in dashed lines, do not extend to the recorder 11.

From the discussion of Figure 3 appearing above it is clear that this apparatus provides a definite advance over prior art devices, but is not as desirable as the apparatus of Figure 1, and, therefore, is preferably employed only when it is impossible to employ the bit as the lowermost electrode.

However, by adding additional potential electrodes above potential electrode 56 and combining the resistivity readings of voltmeters 70, 72 and 74 with that of voltmeter 68 it is possible to obtain additional information useful in studying borehole formations. Primarily, this plurality of potential electrodes can be employed to measure the rate of drilling fluid filtrate-invasion into the formation, and, for this purpose, it is desirable to have as many electrodes as possible distributed from the vicinity of the bit to a point as far as 10 feet or more above the bit.

It is to be understood that the examples and specific apparati shown and described herein shall not be construed as limiting the scope of the instant invention, but that certain variations thereof will be apparent to those skilled in the art. For example, it is known to those skilled in the art that the measured potential drops referred to herein may be recorded directly in terms of resistivities. In addition, although the apparati of the instance invention are best adapted for use in conjunction with down-hole recording and power supply systems such as shown in the Oil and Gas Journal, dated March 28, 1955, pages 115 through 117, a multi-channel recording oscillograph or the like, may be used at the surface of the earth by known means, such as cables built into the drill string or telemetering systems.

I claim:

1. An apparatus for electrically logging earth formations traversed by a borehole comprising a drill bit, a tubular drill string, including serially connected, a first electrical insulating section immediately adjacent said drill bit, a first metallic section immediately adjacent said first insulating section, a second electrical insulating section immediately adjacent said first metallic section, a second metallic section located a sufficient distance above said drill bit to permit invasion of drilling fluid filtrate into earth formations adjacent second metallic section during drilling operations, a third electrical insulating section, a third metallic section, a fourth electrical insulating section and a fourth metallic section extending to the rotary table supporting said drill string, said drill bit and said first metallic section being electrically connected through a first electrical resistor of low value adapted to maintain said bit and said first metallic section at essentially the same voltage, said first and said second metallic sections being electrically connected through a second electrical resistor of low value adapted to maintain said first and second metallic sections at essentially the same voltage and said first and third metallic sections electrically connected by means for maintaining said first and third metallic sections at the same potential, a source of electrical current electrically connected to said first and fourth metallic sections, means for measuring the potential difference across said first electrical resistor, means for measuring the potential difference between said drill bit and said fourth metallic section, means for measuring the potential difference across said second electrical resistor, means for measuring the potential difference between said second and said fourth metallic sections and means for recording the depth of each measurement.

2. Apparatus for electrically logging earth formations traversed by a borehole comprising a drill bit, a tubular drill string including, serially connected, a first electrical insulating section immediately adjacent said drill bit, a first metallic section immediately adjacent said first insulating section, a second electrical insulating section immediately adjacent said first metallic section and a second metallic section extending to the rotary table supporting said drill string, said drill bit and said first metallic section being electrically connected through an electrical resistor of low value adapted to maintain said bit and said first metallic section at essentially the same voltage, a source of electrical current electrically connected to said first and second metallic sections, means for measuring the potential difference across said electrical resistor, means for measuring the potential difference between said drill bit and said second metallic section, and means for recording the depth of each measurement.

3. The method of electrically logging earth formations traversed by a borehole during the drilling thereof comprising simultaneously impressing an electrical current on the earth formations traversed by said borehole at a point along said borehole at which substantially no invasion of said formations by a drilling fluid filtrate has occurred, and on the earth formations traversed by said borehole at a point along said borehole at which substantial invasion of said formations by a drilling fluid filtrate has occured; electrically directing said current into said formations to prevent borehole and bed effect errors; simultaneously measuring the potential difference across said earth formations which have not been invaded by a drilling fluid filtrate and the potential difference across the vertical section of said earth formations which have been invaded by a drilling fluid filtrate; and simultaneously and continuously recording the depths at which said measurements are made.

4. A method of electrically logging earth formations traversed by a borehole during the drilling thereof comprising simultaneously impressing an electric current on the earth formations adjacent the drill bit and on the earth formations traversed by said borehole at a point along said borehole at which substantial invasion of said earth formations by a drilling fluid filtrate has occurred; simultaneously directing said current into said formations by maintaining a common voltage above said drill bit so that the paths of said current describe a substantially hemispherical pattern having said drill bit as the center of the hemisphere, and directing said current into said formations at said point along said borehole at which substantial invasion of said earth formations by a drilling fluid filtrate has occurred by maintaining common voltages above and below said point so that the paths of said current describe a horizontal sheet of current perpendicular to said borehole; simultaneously measuring the potential difference across a vertical section of said earth formations in said hemispherical pattern and the potential difference across a second vertical section of said earth formations in said horizontal sheet; and simultaneously and continuously recording the depths at which said measurements are made.

5. The method of electrically logging earth formations traversed by a borehole during the drilling thereof comprising simultaneously impressing an electric current through the drill bit on the earth formations under and adjacent said drill bit and impressing an electric current on the earth formations traversed by said borehole at a point along said borehole at which substantial invasion of said earth formations by a drilling fluid filtrate has occurred; simultaneously directing said current into said formations by maintaining a common voltage above said drill bit so that the paths of said current describe a substantially hemispherical pattern having said drill bit as the center of said hemisphere, and directing said current into said formations at said point along said borehole at which substantial invasion of said earth formations by a drilling fluid filtrate has occurred by maintaining common voltages above and below said point so that the paths of said current describe a horizontal sheet of current perpendicular to said borehole; and simultaneously measuring the potential difference across a vertical section of said earth formation in said hemispherical pattern and the potential difference across a second vertical section of said earth formations in said horizontal sheet; and simultaneously and continuously recording the depths at which said measurements are made.

6. The method of electrically logging earth formations traversed by a borehole during the drilling thereof comprising simultaneously introducing an electric current through the drill bit to the earth formations under and adjacent said bit, introducing an electric current into the earth formations traversed by said borehole at a point along said borehole at which substantial invasion of said earth formations by a drilling fluid filtrate has occurred; simultaneously electrically directing to prevent borehole and bed effects, said current into said formations by maintaining a common voltage above said drill bit so that the paths of said current describe a substantially hemispherical pattern having said drill bit as the center of the hemisphere, and directing said current into said formations at said point along said borehole at which substantial invasion of said earth formations by a drilling fluid filtrate has occurred by maintaining common voltages above and below said point so that the paths of said current describe a horizontal sheet of current perpendicular to said borehole; simultaneously measuring the potential difference across a vertical section of said earth formations under and adjacent said drill bit and the potential difference across a second vertical section of said earth formations in said horizontal sheet; and simultaneously and continuously recording the depths at which said measurements are made.

References Cited in the file of this patent

UNITED STATES PATENTS

| | | |
|---|---|---|
| 2,313,384 | Lee | Mar. 9, 1943 |
| 2,370,814 | Riise | Mar. 6, 1945 |
| 2,370,818 | Silverman | Mar. 6, 1945 |
| 2,380,520 | Hassler | July 31, 1945 |
| 2,400,170 | Silverman | May 14, 1946 |
| 2,428,034 | Nichols et al. | Sept. 30, 1947 |

UNITED STATES PATENT OFFICE
CERTIFICATE OF CORRECTION

Patent No. 2,941,784

June 21, 1960

John L. Martin

It is hereby certified that error appears in the printed specification of the above numbered patent requiring correction and that the said Letters Patent should read as corrected below.

Column 1, line 27, for "leg" read -- log --; column 3, line 55, for "betweent" read -- between --; column 5, line 33, for "annnular" read -- annular --; column 9, line 4, for "formation" read -- formations --.

Signed and sealed this 3rd day of January 1961.

(SEAL)

Attest:

KARL H. AXLINE
Attesting Officer

ROBERT C. WATSON
Commissioner of Patents